US012603113B1

(12) United States Patent
Yan et al.

(10) Patent No.: US 12,603,113 B1
(45) Date of Patent: Apr. 14, 2026

(54) SYNCHRONIZING AUDIO AND VIDEO DATA

(71) Applicant: Meta Platforms, Inc., Menlo Park, CA (US)

(72) Inventors: Xueting Yan, Newark, CA (US); Hao Li, San Carlos, CA (US); Qin Huang, Foster City, CA (US); Jodi Jiaming Huang, Mountain View, CA (US); Siyuan Yu, Fremont, CA (US); Jing Yang Zhang, Seattle, WA (US); Yu-Chih Tung, Cupertino, CA (US); Hao Huang, Pleasanton, CA (US); Yuncheng Wu, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 275 days.

(21) Appl. No.: 18/306,920

(22) Filed: Apr. 25, 2023

Related U.S. Application Data

(60) Provisional application No. 63/421,482, filed on Nov. 1, 2022, provisional application No. 63/421,485, filed on Nov. 1, 2022, provisional application No. 63/414,833, filed on Oct. 10, 2022, provisional application No. 63/409,943, filed on Sep. 26, 2022.

(51) Int. Cl.
*G11B 27/36* (2006.01)

(52) U.S. Cl.
CPC .................................... *G11B 27/36* (2013.01)

(58) Field of Classification Search
CPC ...................................................... G11B 27/36
See application file for complete search history.

(56) References Cited

U.S. PATENT DOCUMENTS

| | | | |
|---|---|---|---|
| 6,686,970 B1 | 2/2004 | Windle | |
| 2008/0222178 A1* | 9/2008 | Petri | ....................... G06F 16/93 |
| 2010/0223128 A1 | 9/2010 | Dukellis et al. | |
| 2011/0213614 A1 | 9/2011 | Lu et al. | |
| 2011/0259179 A1 | 10/2011 | Oertl et al. | |
| 2012/0188411 A1* | 7/2012 | Jang | ..................... H04N 5/2621 |
| | | | 348/222.1 |
| 2013/0207572 A1* | 8/2013 | Tucker | .................. H05B 45/20 |
| | | | 315/297 |
| 2014/0123836 A1 | 5/2014 | Vorobyev et al. | |

(Continued)

FOREIGN PATENT DOCUMENTS

WO          2019241785 A1    12/2019

OTHER PUBLICATIONS

Davis A., et al., "Visual Rhythm and Beat," ACM Transactions on Graphics (TOG), 2018, vol. 37, No. 4, 11 Pages.

*Primary Examiner* — Sunghyoun Park
(74) *Attorney, Agent, or Firm* — EVERSHEDS SUTHERLAND (US) LLP

(57) ABSTRACT

Methods, systems, and storage media for synchronizing audio and video data are disclosed. Exemplary implementations may: receive at least one visual media file; receive audio data; determine a beat pattern associated with the audio data; generate a visual effect sequence comprising the at least one visual media file and at least one three-dimensional feature; and generate a resultant video file comprising the visual effect sequence and a transition sequence associated with the beat pattern.

18 Claims, 9 Drawing Sheets

(56) References Cited

U.S. PATENT DOCUMENTS

| | | | |
|---|---|---|---|
| 2015/0243324 A1* | 8/2015 | Sandrew | H04N 13/266 |
| | | | 386/278 |
| 2016/0139871 A1 | 5/2016 | Farshi et al. | |
| 2018/0077362 A1* | 3/2018 | Prasad | H04N 21/23418 |
| 2018/0286458 A1 | 10/2018 | Harron et al. | |
| 2018/0374462 A1* | 12/2018 | Steinwedel | G06T 11/00 |
| 2020/0304755 A1 | 9/2020 | Narayan et al. | |
| 2022/0343923 A1* | 10/2022 | Todorov | G06F 3/165 |
| 2022/0392461 A1 | 12/2022 | Giron et al. | |
| 2023/0005201 A1 | 1/2023 | Wu et al. | |
| 2024/0242736 A1 | 7/2024 | Rashid et al. | |

* cited by examiner

SYNCHRONIZING AUDIO AND VIDEO DATA

CROSS REFERENCE TO RELATED APPLICATIONS

This application claims priority under 35 U.S.C. § 119(e) to U.S. Patent Application No. 63/409,943 filed Sep. 26, 2022, U.S. Patent Application No. 63/414,833 filed Oct. 10, 2022, U.S. Patent Application No. 63/421,482 filed Nov. 1, 2022, and U.S. Patent Application No. 63/421,485 filed Nov. 1, 2022, the disclosures of which applications are incorporated by reference herein, in their entirety, for all purposes.

TECHNICAL FIELD

The present disclosure generally relates to synchronizing audio and video data, and more particularly to generating videos with a visual effect sequence and a transition sequence coordinated with a beat pattern of accompanying music.

BACKGROUND

Social media platforms facilitate sharing of information among virtual communities and networks. Social media platforms typically include interactive internet-based applications. Users on social media platforms send and receive content, such as through posts on user feeds, direct messages, etc. The content can include text, audio, video, and/or images.

BRIEF SUMMARY

The subject disclosure provides for systems and methods for synchronizing audio and video data. A user is allowed to create compelling videos based on imagery from their media gallery set to music. For example, imagery may be enhanced through converting two-dimensional scenes to three-dimensional scenes. Moreover, transitions between different video clips may coincide with beats in the music.

One aspect of the present disclosure relates to a method for synchronizing audio and video data. The method may include receiving at least one visual media file. The at least one visual media file may include an image file or a video file. The method may include receiving audio data. The audio data may include at least one song. The method may include determining a beat pattern associated with the audio data. The method may include generating a visual effect sequence including the at least one visual media file and at least one three-dimensional feature. The method may include generating a resultant video file including the visual effect sequence and a transition sequence associated with the beat pattern.

Another aspect of the present disclosure relates to a system configured for synchronizing audio and video data. The system may include one or more hardware processors configured by machine-readable instructions. The processor(s) may be configured to receive at least one visual media file. The at least one visual media file may include an image file or a video file. The processor(s) may be configured to receive audio data. The audio data may include at least one song. Receiving the audio data may include determining a vibe associated with synchronizing the at least one visual media file and the audio data. The processor(s) may be configured to determine a beat pattern associated with the audio data. The processor(s) may be configured to generate a visual effect sequence including the at least one visual media file and at least one three-dimensional feature. The at least one three-dimensional feature may be generated from a model configured to extract a depth projection from a two-dimensional image. The at least one three-dimensional feature may include an object in a foreground of the at least one visual media file. The at least one visual media file may be re-rendered with a zoom-and-pan effect such that the object appears to move relative to a background of the at least one visual media file as a field of view changes. The processor(s) may be configured to generate a resultant video file including the visual effect sequence and a transition sequence associated with the beat pattern.

Yet another aspect of the present disclosure relates to a non-transient computer-readable storage medium having instructions embodied thereon, the instructions being executable by one or more processors to perform a method for synchronizing audio and video data. The method may include receiving at least one visual media file. The at least one visual media file may include an image file or a video file. The method may include receiving audio data. The audio data may include at least one song. Receiving the audio data may include determining a vibe associated with synchronizing the at least one visual media file and the audio data. The method may include determining a beat pattern associated with the audio data. The method may include generating a visual effect sequence including the at least one visual media file and at least one three-dimensional feature. The at least one three-dimensional feature may be generated from a model configured to extract a depth projection from a two-dimensional image. The at least one three-dimensional feature may include an object in a foreground of the at least one visual media file. The at least one visual media file may be re-rendered with a zoom-and-pan effect such that the object appears to move relative to a background of the at least one visual media file as a field of view changes. The method may include generating a resultant video file including the visual effect sequence and a transition sequence associated with the beat pattern. Generating the resultant video file may include synchronizing the at least one visual media to the beat pattern by trimming the at least one visual media file such that a beginning and an ending coincide with beats in the beat pattern.

Still another aspect of the present disclosure relates to a system configured for synchronizing audio and video data. The system may include means for receiving at least one visual media file. The at least one visual media file may include an image file or a video file. The system may include means for receiving audio data. The audio data may include at least one song. The system may include means for determining a beat pattern associated with the audio data. The system may include means for generating a visual effect sequence including the at least one visual media file and at least one three-dimensional feature. The system may include means for generating a resultant video file including the visual effect sequence and a transition sequence associated with the beat pattern.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Figure 1:
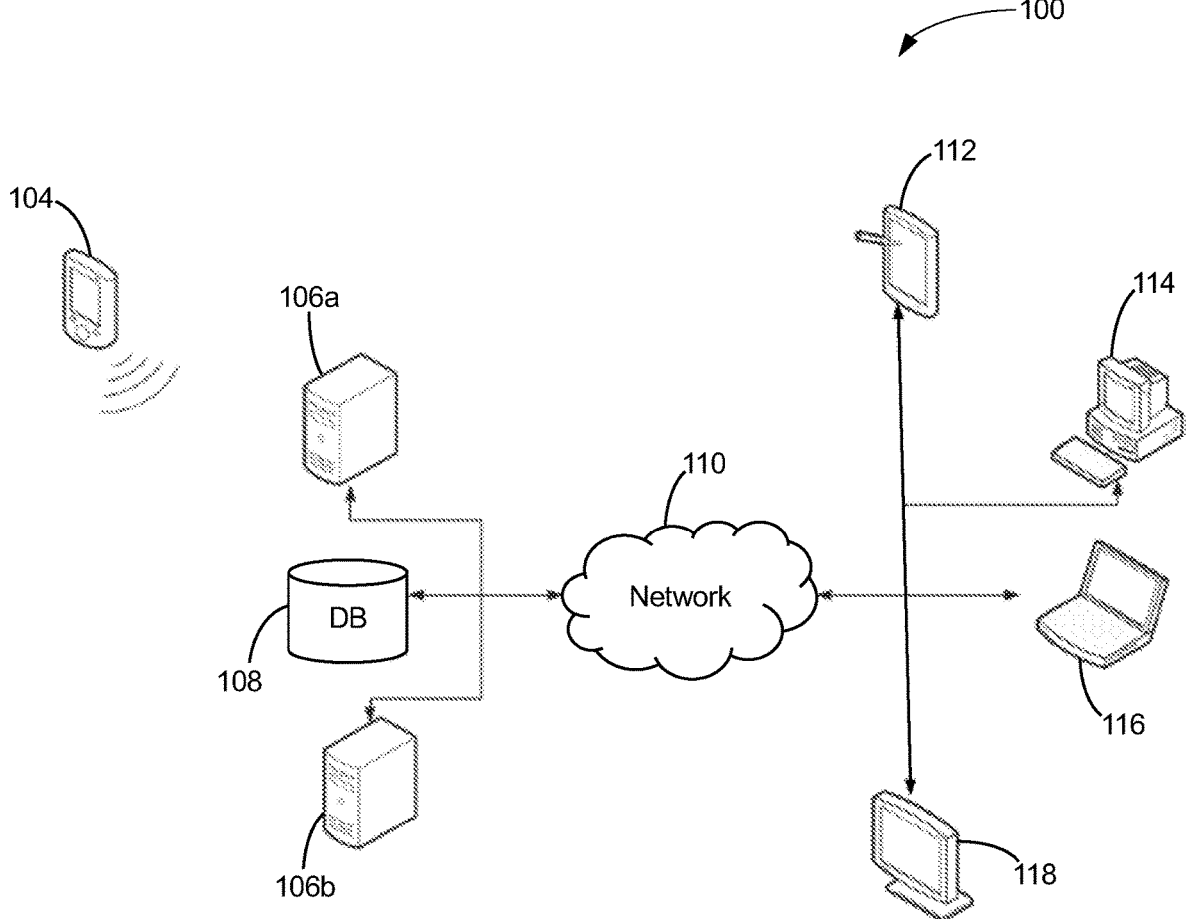
FIG. 1 is a block diagram illustrating an overview of an environment in which some implementations of the disclosed technology can operate.

FIG. 1 is a block diagram illustrating an overview of an environment 100 in which some implementations of the disclosed technology can operate. The environment 100 can include one or more client computing devices, mobile device 104, tablet 112, personal computer 114, laptop 116, desktop 118, and/or the like. Client devices may communicate wirelessly via the network 110. The client computing devices can operate in a networked environment using logical connections through network 110 to one or more remote computers, such as server computing devices. The server computing devices 106a-106b may be configured to show (e.g., make encrypted content visible) content to one or more of the client computing devices for those client computing devices that presented a correct public key. As an example, the server computing devices 106a-106b can include a database (e.g., database 108) that tracks which users of the client computing devices have granted access to their encrypted content (e.g., encrypted by corresponding privately held private keys) to other client users.

In some implementations, the environment 100 may include a server such as an edge server which receives client requests and coordinates fulfillment of those requests through other servers. The server may include the server computing devices 106a-106b, which may logically form a single server. Alternatively, the server computing devices

106a-106b may each be a distributed computing environment encompassing multiple computing devices located at the same or at geographically disparate physical locations. The client computing devices and server computing devices 106a-106b can each act as a server or client to other server/client device(s). The server computing devices 106a-106b can connect to a database 108 or can comprise its own memory. Each server computing devices 106a-106b can correspond to a group of servers, and each of these servers can share a database 108 or can have their own database 108. The database 108 may logically form a single unit or may be part of a distributed computing environment encompassing multiple computing devices that are located within their corresponding server, located at the same, or located at geographically disparate physical locations. The database 108 can store data indicative of keys or access granted by a given user to other users of the given user's encrypted content and/or shared social media content that can be subscribed to by other users. The database 108 may also be used to facilitate key rotation in a one-to-many encryption architecture by causing issue of new keys when a copy of a shared key becomes comprised, for example.

The network 110 can be a local area network (LAN), a wide area network (WAN), a mesh network, a hybrid network, or other wired or wireless networks. The network 110 may be the Internet or some other public or private network. Client computing devices can be connected to network 110 through a network interface, such as by wired or wireless communication. The connections can be any kind of local, wide area, wired, or wireless network, including the network 110 or a separate public or private network. In some implementations, the server computing devices 106a-106b can be used as part of a social network such as implemented via the network 110. The social network can host content and protect access to the content, such as via the database 108, although the server computing devices 106a-106b of the social network do not have access to private keys and can be remote/separate from the application(s) that perform key generation and content encryption. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc.

Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea. The social networking system can enable a user to enter and display information related to the users' interests, age/date of birth, location (e.g., longitude/latitude, country, region, city, etc.), education information, life stage, relationship status, name, a model of devices typically used, languages identified as ones the user is familiar with, occupation, contact information, or other demographic or biographical information in the users' profile. Any such information can be represented, in various implementations, by a node or edge between nodes in the social graph.

The social networking system can enable a user to upload or create pictures, videos, documents, songs, or other content items, and can enable a user to create and schedule events. Content items can be represented, in various implementations, by a node or edge between nodes in the social graph. The social networking system can enable a user to perform uploads or create content items, interact with content items or other users, express an interest or opinion, or perform other actions. The social networking system can provide various means to interact with non-user objects within the social networking system. Actions can be represented, in various implementations, by a node or edge between nodes in the social graph. For example, a user can form or join groups, or become a fan of a page or entity within the social networking system. In addition, the user can create, download, view, upload, link to, tag, edit, or play a social networking system object. The user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, the user can use location detection functionality (such as a GPS receiver on a mobile device) to "check in" to a particular location, and an edge can connect the user's node with the location's node in the social graph.

User in social media platforms often wish to create their own videos to share with other users. Video production capabilities in social medial platforms often requires video content and audio content, synchronization between the content, and audio and video effects to enhance the overall video production. Since most users lack advance skills and/or tools for professional level video editing, user-created videos generally lack a polished appearance.

The subject disclosure provides for systems and methods for synchronizing audio and video data. A user is allowed to create compelling videos based on imagery from their media gallery set to music. For example, imagery may be enhanced through converting two-dimensional scenes to three-dimensional scenes. Moreover, transitions between different video clips may coincide with beats in the music.

Implementations described herein address the aforementioned shortcomings and other shortcomings by providing music synchronization to image processing. For example, some implementations provide video effects including transforming a two-dimensional image or video into a three dimensional image or video. Further, the resultant three-dimensional image or video can be enhanced by adding a musical selection. The musical selection can be synchronized to transition with portions of the video. With music synchronization, some implementations take a pre-selected music track, along with its beats information, and choose key beats to match with visual transitions within the video. In some implementations, the visual transitions may be the transitions between individual video segments. A wider range of visual transitions within each individual video segment (intra-segment) besides the inter-segment transitions can be implemented.

Some implementations may provide a tool that automatically selects music, and synchronizes the selected music with video clips which are transformed from images with various visual effects. Users may upload one or multiple images. A vibe for a desired output video may also be an input, which can either be determined by the user, an audience, and/or another source. Given the images, vibe, and some other metadata, a visual transformation service may generate a sequence of visual effects. Appropriate music candidates may be selected, and their highlights extracted. Given a visual effects sequence and highlights of music candidates, a three-dimensional effect composition function may facilitate synchronizing the visual effects with music highlight clips based on music beats.

Figure 2:
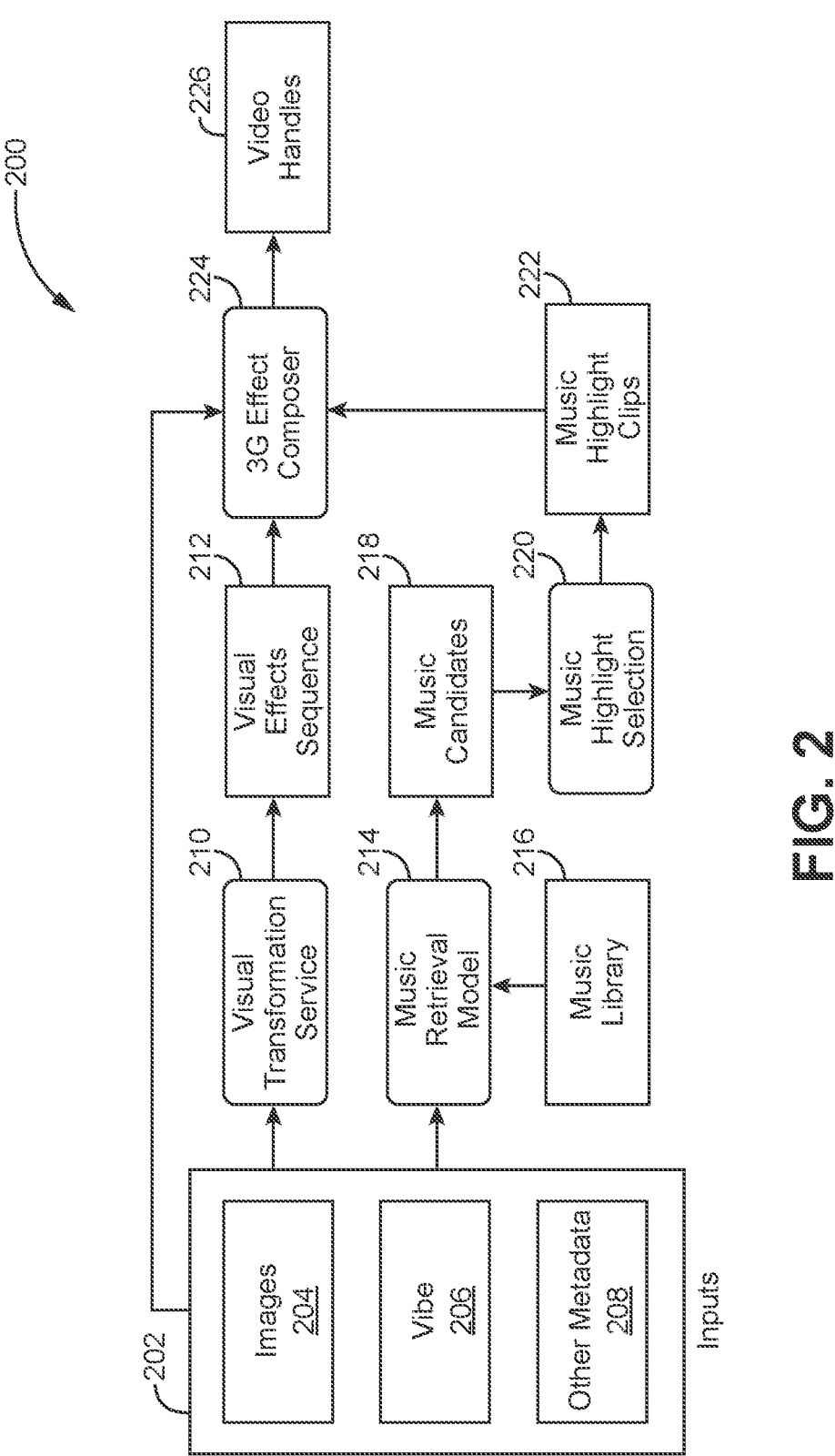
FIG. 2 illustrates an example music linking process, in accordance with one or more implementations.

FIG. 2 illustrates an example music linking process 200, in accordance with one or more implementations. At step 202, inputs may be provided. The inputs may be provided by one or more of user selections, system suggestions, and/or other sources. The inputs may include one or more of images 204, a vibe 206, other metadata 208, and/or other information. The images 204 may include digital images, one or more frames of individual videos, files from a media library, and/or other images. By way of non-limiting example, the vibe 206 may indicate one or more of a general feeling, sensation, and/or emotion evoked by visual and/or audio information. By way of non-limiting example, the vibe 206 may include one or more of affection, concern, desire, empathy, excitement, happiness, joy, love, passion, pride, sadness, sentiment, sympathy, and/or warmth. The other metadata 208 may include information associated with the images 204. At step 210, the inputs may be provided to a visual transformation service. The visual transformation service may apply one or more transformations to one or more of the images 204. At step 212, a visual effects sequence may be generated. At step 214, the inputs may be provided a music retrieval model (see, e.g., FIG. 3). At step 216, a music library may be provided to the music retrieval model. At step 218, music candidates may be provided based on the music retrieval model. At step 220, music highlights may be selected. At step 222, music highlight clips may be provided. At step 224, the visual effects sequence and the music highlight clips may be provided to a three-dimensional effects composer (see, e.g., FIG. 4). At step 226, video handles may be provided based on output from the three-dimensional effects composer. In some implementations, given a music highlight clip, the three-dimensional effects composer may first extract a beat pattern from the music highlight clip, then synchronize the visual effects sequence with the music highlight clip by playing new visual effects at some selected beats (see, e.g., FIG. 5). Output from the three-dimensional effects composer may include a compilation structure to facilitate rendering and generating an output video (see, e.g., FIG. 6).

Figure 3:
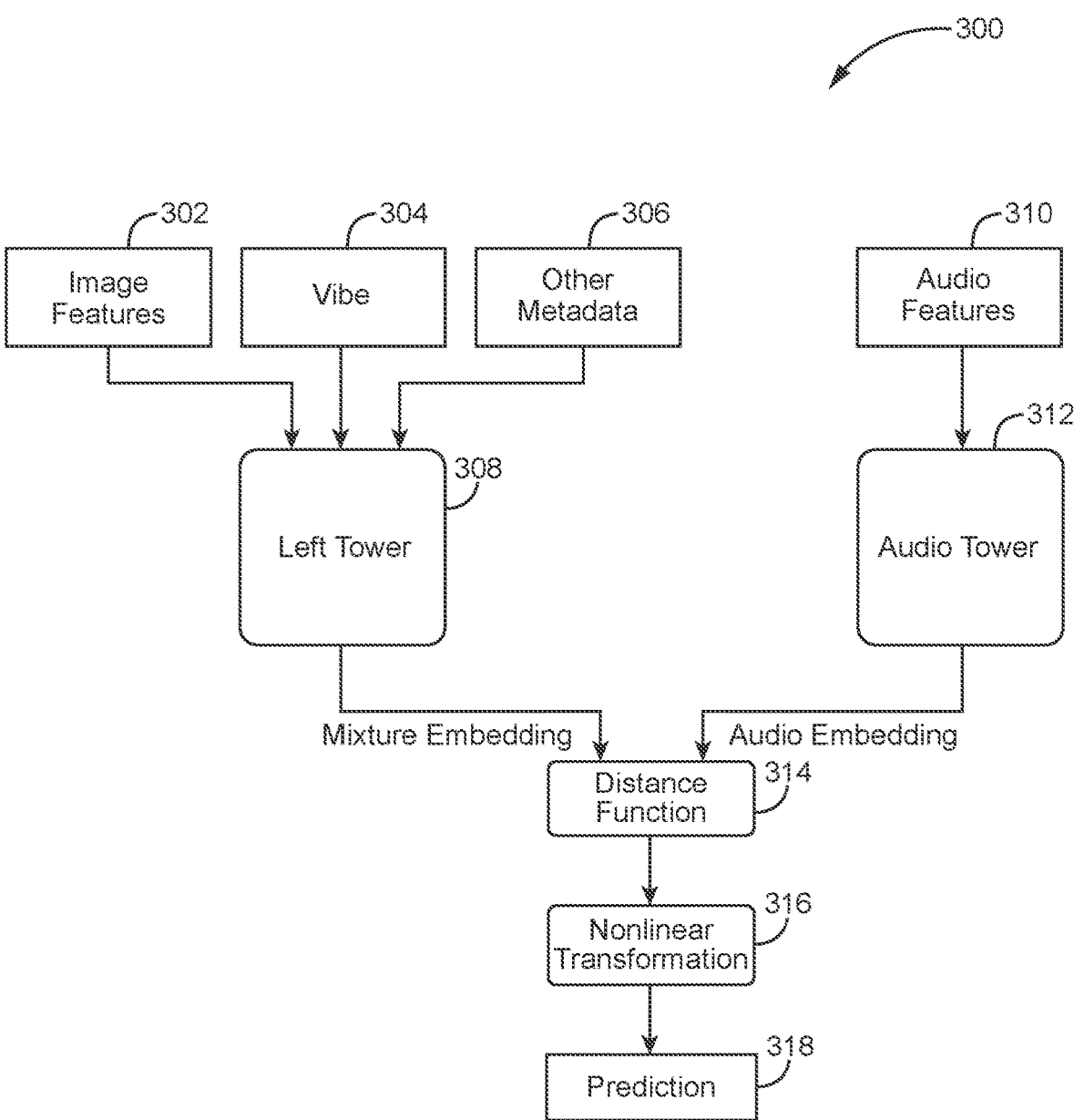
FIG. 3 illustrates an example music retrieval process, in accordance with one or more implementations.

FIG. 3 illustrates an example music retrieval process 300, in accordance with one or more implementations. At step 302, image features may be obtained and provided to a left tower. The image features may include thumbnail images and/or other features. At step 304, a vibe may be obtained and provided to the left tower. The vibe may be provided by a user through a user selection or other input. The vibe may be determined through human annotation. The vibe may be predicted through a machine-learning model trained on a subset of human-annotated images. At step 306, other metadata may be obtained and provided to the left tower. At step 308, the left tower may provide a mixture embedding. At step 310, audio features from a music library may be provided to an audio tower. At step 312, the audio tower may provide an audio embedding. The audio embedding may be pre-computed for some or all audio tracks (e.g, songs) in the music library. At step 314, a distance function may be determined based on the mixture embedding and the audio embedding. At step 316, a non-linear transformation may be applied to a result of the distance function. At step 318, a prediction may be determined based on a result of the non-linear transformation.

According to some implementations, for each audio track in the music library, a music highlight start time and a duration may be determined such that a highlight clip may be used for music linking. The highlight clip may start from the start time and lasts for the duration of the highlight clip. The music highlight information (e.g., start time and duration) may be provided through one or more of user selections, a highlight prediction model, and/or other sources. The system can use user clicks whenever possible. For each audio track, there may be multiple highlight start times such that a single clip may be selected based on one or more of having the most user selections, having the highest prediction score, and/or other criteria. As for the duration, it may be determined based on one or more of the length of a visual effect sequence, the ending of the highlight clip being a natural conclusion, and/or other information.

Figure 4:
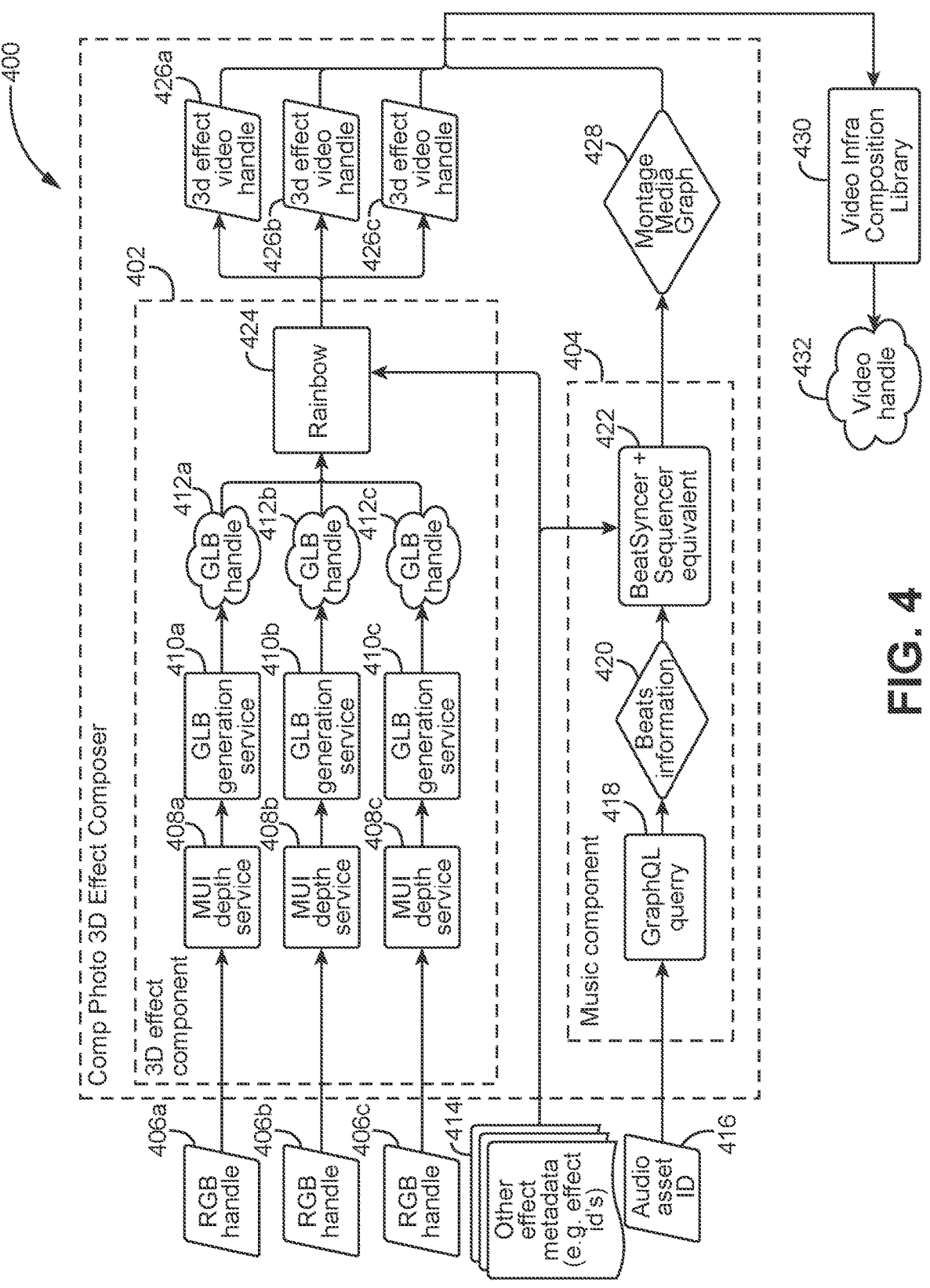
FIG. 4 illustrates an example three-dimensional effect composition process, in accordance with one or more implementations.

FIG. 4 illustrates an example three-dimensional effect composition process 400, in accordance with one or more implementations. The process 400 includes a three-dimensional effect component 402, a music component 404, and/or other components. At steps 406*a*, 406*b*, 406*c*, red-green-blue (RGB) handles are provided to the three-dimensional effect component 402. A given RGB handle may include an input image (e.g., from user upload, media library, etc.). At steps 408*a*, 408*b*, 408*c*, multimedia user interface (MUI) depth services may be applied to the RGB handles. The MUI depth services may be configured to provide depth estimations associated with the RGB handles. The depth estimations may describe a perceived depth of objects and other surfaces in imagery of the RGB handles. At steps 410*a*, 410*b*, 410*c*, a graphics library transmission format binary file (GLB) generation service may be applied to a result of the MUI depth services. At steps 412*a*, 412*b*, 412*c*, GLB handles may be provided corresponding to the RGB handles. A given GLB handle may include a depth image corresponding to a given input image.

Other effect metadata (e.g., effect identifiers, visual effects sequence, the highlight start time and the duration of a music highlight clip, etc.) may be provided to the three-dimensional effect component 402 and the music component 404 at step 414 of process 400. At step 416, an audio asset identifier (ID) associated with an audio asset (e.g., an audio track in a music library) may be provided to the music component 404. At step 418, a query (e.g., GraphQL query) may be performed based on the audio asset ID. For example, beats information of a music candidate may be extracted via a GraphQL query. At step 420, beats information may be obtained of the audio asset. The beat information may include a beat pattern. The beat information may indicate when beats occur during a music track. The beat information may be obtained from pre-determined beat information, a beat pattern analysis of the audio asset, and/or other sources. At step 422, a beat synchronizer and sequencer equivalent may be applied to the audio asset based on the beats information. At step 424, a rainbow (i.e., three-dimensional rendering) may process the GBL handles, other effect metadata, a result of the beat synchronizer and sequencer equivalent, and/or other information to generate video clips. At steps 426*a*, 426*b*, 426*c*, three-dimensional effect video handles may be generated based on a result of the rainbow processing. At step 428, a montage media graph may be generated based on a result of the beat synchronizer and sequencer equivalent. At step 430, a video infra composition library may be provided based on the three-dimensional effect video handles and the montage media graph. The video infra composition library may include a solution for rendering a composition into a final video, which may include one or more of stitching three-dimensional video segments, attaching music, adding transitions, and/or other steps. At step 432, a video handle may be determined based on the video infra composition library.

Figure 5:
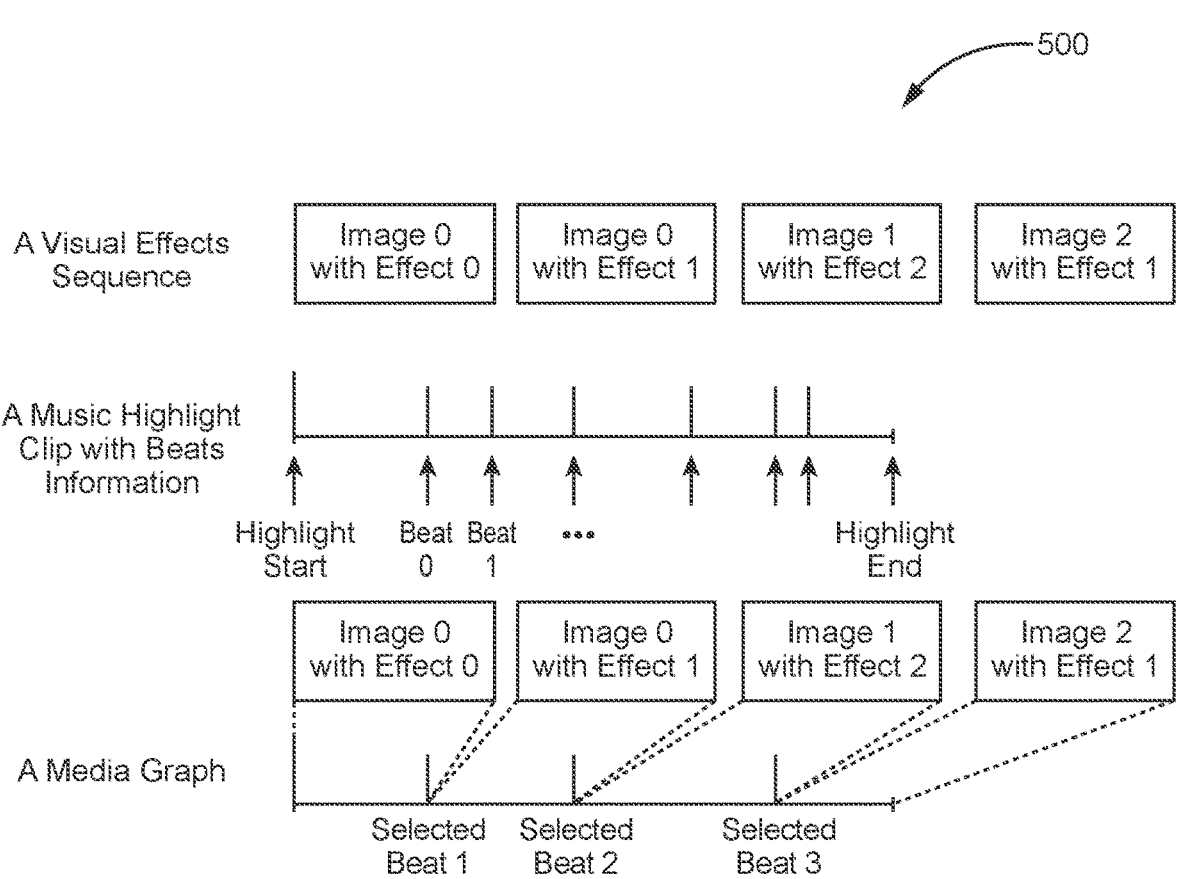
FIG. 5 illustrates an example synchronization process for combining visual effects with music, in accordance with one or more implementation.

FIG. 5 illustrates an example synchronization process 500 for combining visual effects with music, in accordance with one or more implementation. As shown in FIG. 5, music highlight clips may be segmented into several intervals based on beats information. The number of intervals may be the same as the length of the visual effect sequence. For each interval, a video clip may be inserted. The video clip may start at a selected beat or the highlight start and may end at the next selected beat. The video infra composition library (see, e.g., FIG. 4) may concatenate multiple video clips with the music highlight and generate an output video.

Some implementations may include transformation from static two-dimensional images to three-dimensional videos and accompanying music synchronization. The three-dimensional videos may be generated through depth estimation performed on the two-dimensional image, three-dimensional modeling based on the predicted depth, and rendering of the three-dimensional model to a video based on a fixed sequence of camera movements. A given effect may be associated with a pre-selected music track and beats information (e.g., beat patterns) of the music track. Key beats may be matched with visual transitions within the video. In some implementations, the visual transitions may include transitions between individual video segments, other visual transitions within each individual video segment (intra-segment), and/or other transitions.

Figure 6:
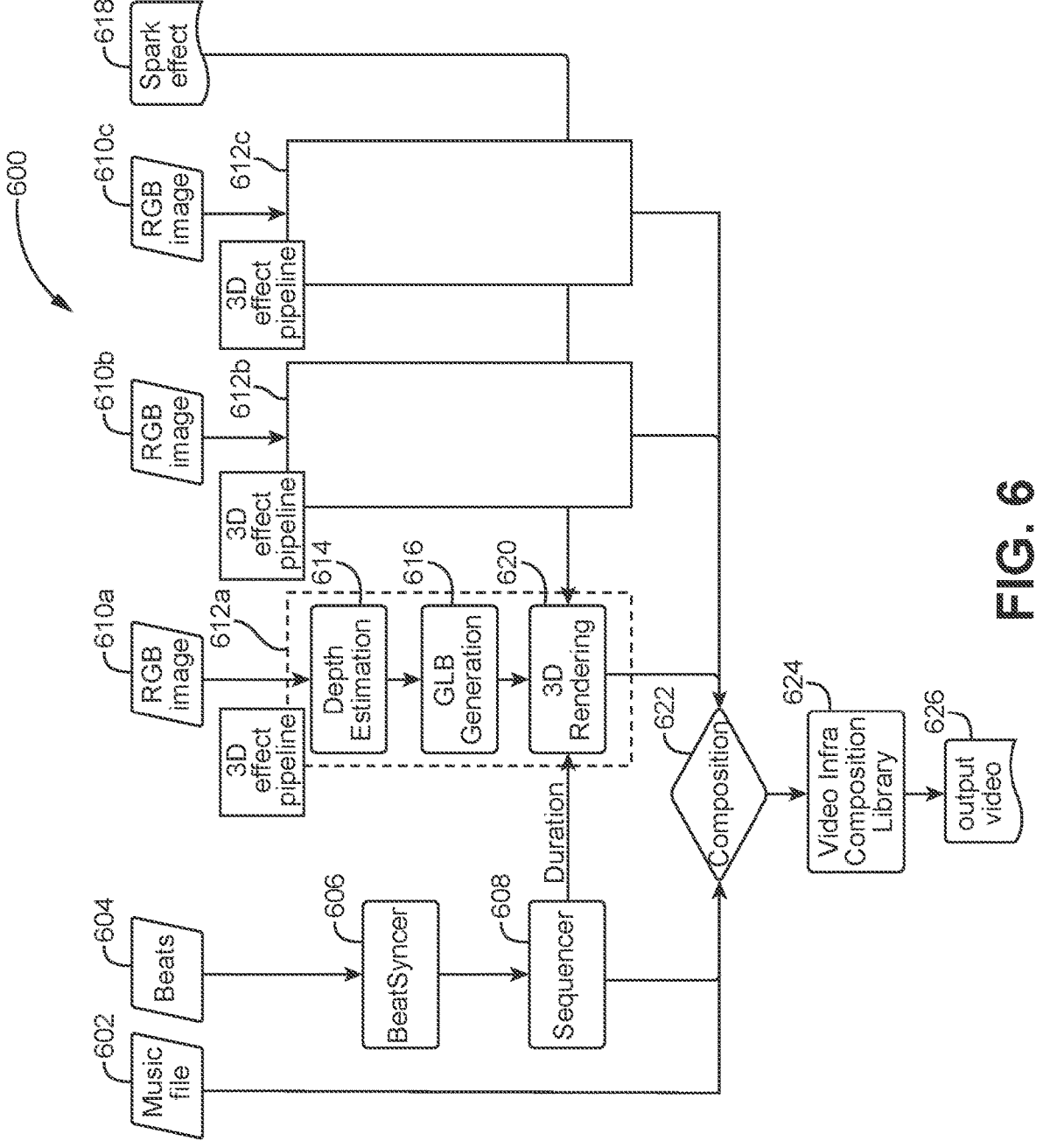
FIG. 6 illustrates an example video rendering process for generating a video based on synchronized visual effects and music, in accordance with one or more implementations.

FIG. 6 illustrates an example video rendering process 600 for generating a video based on synchronized visual effects and music, in accordance with one or more implementations. At step 602, a music file (e.g., from a media library) may be provided. At step 604, beats information associated with the music file may be provided. At step 606, a beats synchronizer may synchronize the music file based on the beats information to generate a highlight clip of the music file. Synchronizing the music file may include splitting an interval into a set of subintervals given limit ending conditions. At step 608, a sequencer may determine a sequence of the highlight of the music file. The sequence may include a compilation of elements of an effect into a graph. At steps 610*a*, 610*b*, 610*c*, RGB images may be provided (e.g., from a media library). At steps 612*a*, 612*b*, 612*c*, the RGB images may be process through three-dimensional effect pipelines. A given pipeline may include, at step 614, a depth estimation on a corresponding RGB image. The depth estimation may include depth information associated with different objects and/or surfaces in imagery of a given RGB image. The depth estimation may be inferred a mono-depth prediction model. At step 616, GLB generation may be performed based on the depth estimation. At step 618, a spark effect may be provided. At step 620, three-dimensional rendering may be performed based on one or more of duration information from the sequencing in step 608, the GLB generation in step 616, the spark effect in step 618, and/or other information. At step 622, composition may be performed based on one or more of the music file in step 602, the sequence in step 608, the three-dimensional rendering in step 620, and/or other information. At step 624, the video infra composition library may be provided based on the composition. At step 626, an output video may be generated based on the video infra composition library. According to some implementations, a pipeline for a three-dimensional music effect may be expressed as a graph within a software developer kit (SDK) with components in the pipeline encapsulated into graph nodes. The output of the graph may be a composition object, which may then be used to render the final output video.

The disclosed system(s) address a problem in traditional audio-to-video synchronization techniques tied to computer technology, namely, the technical problem of enhancing imagery in the video clips and aligning transitions between video clips with beats in accompanying music. The disclosed system solves this technical problem by providing a solution also rooted in computer technology, namely, by providing for generating videos with a visual effect sequence and a transition sequence coordinated with a beat pattern of accompanying music. The disclosed subject technology further provides improvements to the functioning of the computer itself because it improves processing and efficiency in synchronizing audio and video data.

Figure 7:
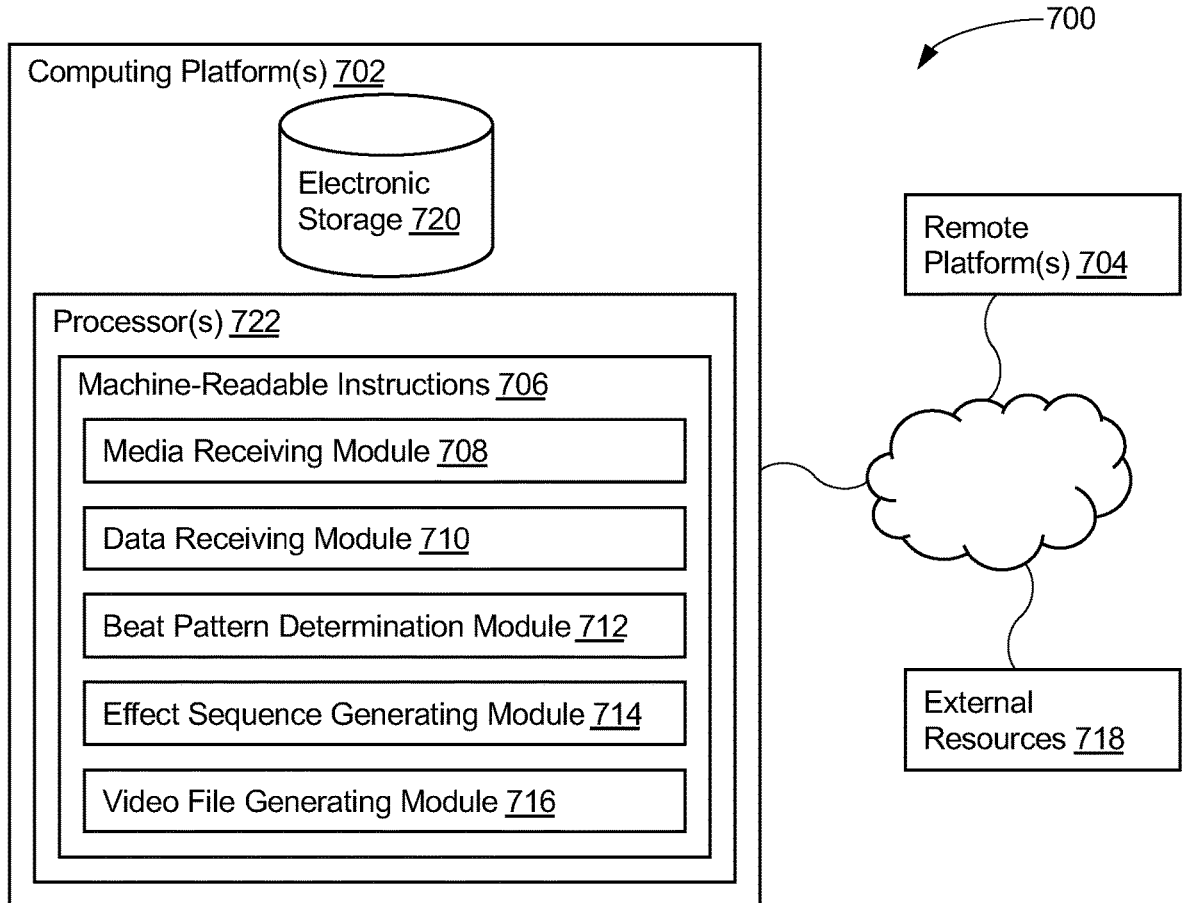
FIG. 7 illustrates a system configured for synchronizing audio and video data, in accordance with one or more implementations.

FIG. 7 illustrates a system 700 configured for synchronizing audio and video data, according to certain aspects of the disclosure. In some implementations, system 700 may include one or more computing platforms 702. Computing platform(s) 702 may be configured to communicate with one or more remote platforms 704 according to a client/server architecture, a peer-to-peer architecture, and/or other architectures. Remote platform(s) 704 may be configured to communicate with other remote platforms via computing platform(s) 702 and/or according to a client/server architecture, a peer-to-peer architecture, and/or other architectures. Users may access system 700 via remote platform(s) 704.

Computing platform(s) 702 may be configured by machine-readable instructions 706. Machine-readable instructions 706 may include one or more instruction modules. The instruction modules may include computer program modules. The instruction modules may include one or more of media receiving module 708, data receiving module 710, beat pattern determination module 712, effect sequence generating module 714, video file generating module 716, and/or other instruction modules.

Media receiving module 708 may be configured to receive at least one visual media file. The at least one visual media file may include an image file or a video file. In some implementations, a given image file may include a digital image. In some implementations, by way of non-limiting example, the digital image may include at least one frame having pixels with numeric representations of color, intensity, and/or gray level to be displayed. In some implementations, a given video file may include a digital video. In some implementations, by way of non-limiting example, the digital video may include a plurality of frames having pixels with numeric representations of color, intensity, and/or gray level to be displayed.

Data receiving module 710 may be configured to receive audio data. Receiving the audio data may be based on an output generated from a music retrieval process. Receiving the audio data may include determining a vibe associated with synchronizing the at least one visual media file and the audio data. The vibe may be determined from metadata associated with one or both of the audio data and/or the at least one visual media file. By way of non-limiting example, the music retrieval process may include receiving input of one or more of an image, a vibe, metadata, and/or a music library. By way of non-limiting example, the music retrieval process may include determining a suggested song from the music library based on one or more of the image, the vibe, and/or the metadata. By way of non-limiting example, the vibe may indicate one or more of a general feeling, sensation, and/or emotion evoked by visual and/or audio information. By way of non-limiting example, the vibe may include one or more of affection, concern, desire, empathy, excitement, happiness, joy, love, passion, pride, sadness, sentiment, sympathy, and/or warmth. The vibe may be determined based on user input. The audio data may include at least one song. The at least one song may include a melody definable by a beat pattern.

Beat pattern determination module 712 may be configured to determine a beat pattern associated with the audio data. The beat pattern may include a series of beats in the at least one song. The series of beats may include a regularly repeating event in at least one song. By way of non-limiting example, the regularly repeating event in the at least one song may include one or more of a stressed moment, an unstressed moment, a sound, and/or a pulse. Determining the beat pattern may include converting a sound waveform of the at least one song into a spectrogram. The spectrogram may include a two-dimensional time-frequency representation of the at least one song. Determining the beat pattern may include weighting energy values within each critical band of a simulated response of a human brain to musical sounds. The simulated response may be based on cochlea model. Determining the beat pattern may include generating a matrix having information about musical sound in the at least one song. The beat pattern can be determined for multiple songs to be integrated into a resultant video file.

Effect sequence generating module 714 may be configured to generate a visual effect sequence including the at least one visual media file and at least one three-dimensional feature. The at least one three-dimensional feature may include an object in a foreground of the at least one visual media file. The at least one three-dimensional feature may be generated from a model configured to extract a depth projection from a two-dimensional image. The at least one visual media file may be re-rendered with a zoom-and-pan effect such that the object appears to move relative to a background of the at least one visual media file as a field of view changes. The zoom-and-pan effect may include decreasing the field of view while simultaneously moving the field of view within bounds of the at least one visual media file.

The visual effect sequence may include one or more successive visual effects. A given visual effect may include a process by which imagery is created and/or manipulated outside a context of underlying visual media. By way of non-limiting example, the given visual effect may include applying one or more of a gradient, a mathematical colormap, a change in color value, a translation, a flip, a mirror, a rotation, a scaling up or down, a shear, a distortion, a blur, and/or a filter to a given visual media file.

Video file generating module 716 may be configured to generate a resultant video file including the visual effect sequence and a transition sequence associated with the beat pattern. Different visual effects may be applied to different video clips in the resultant video file. Generating the resultant video file may include synchronizing the at least one visual media to the beat pattern by trimming the at least one visual media file such that a beginning and an ending coincide with beats in the beat pattern. Trimming the at least one visual media file may include determining points to trim the at least one visual media file.

In some implementations, computing platform(s) 702, remote platform(s) 704, and/or external resources 718 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 702, remote platform(s) 704, and/or external resources 718 may be operatively linked via some other communication media.

A given remote platform 704 may include one or more processors configured to execute computer program modules. The computer program modules may be configured to enable an expert or user associated with the given remote platform 704 to interface with system 700 and/or external resources 718, and/or provide other functionality attributed herein to remote platform(s) 704. By way of non-limiting example, a given remote platform 704 and/or a given computing platform 702 may include one or more of a server, a desktop computer, a laptop computer, a handheld computer, a tablet computing platform, a NetBook, a Smartphone, a gaming console, and/or other computing platforms.

External resources 718 may include sources of information outside of system 700, external entities participating with system 700, and/or other resources. In some implementations, some or all of the functionality attributed herein to external resources 718 may be provided by resources included in system 700.

Computing platform(s) 702 may include electronic storage 720, one or more processors 722, and/or other components. Computing platform(s) 702 may include communication lines, or ports to enable the exchange of information with a network and/or other computing platforms. Illustration of computing platform(s) 702 in FIG. 7 is not intended to be limiting. Computing platform(s) 702 may include a plurality of hardware, software, and/or firmware components operating together to provide the functionality attributed herein to computing platform(s) 702. For example, computing platform(s) 702 may be implemented by a cloud of computing platforms operating together as computing platform(s) 702.

Electronic storage 720 may comprise non-transitory storage media that electronically stores information. The electronic storage media of electronic storage 720 may include one or both of system storage that is provided integrally (i.e., substantially non-removable) with computing platform(s) 702 and/or removable storage that is removably connectable to computing platform(s) 702 via, for example, a port (e.g., a USB port, a firewire port, etc.) or a drive (e.g., a disk drive, etc.). Electronic storage 720 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 720 may include one or more virtual storage resources (e.g., cloud storage, a virtual private network, and/or other virtual storage resources). Electronic storage 720 may store software algorithms, information determined by processor(s) 722, information received from computing platform(s) 702, information received from remote platform(s) 704, and/or other information that enables computing platform(s) 702 to function as described herein.

Processor(s) 722 may be configured to provide information processing capabilities in computing platform(s) 702. As such, processor(s) 722 may include one or more of a digital processor, an analog processor, a digital circuit designed to process information, an analog circuit designed to process information, a state machine, and/or other mechanisms for electronically processing information. Although processor(s) 722 is shown in FIG. 7 as a single entity, this is for illustrative purposes only. In some implementations, processor(s) 722 may include a plurality of processing units. These processing units may be physically located within the same device, or processor(s) 722 may represent processing functionality of a plurality of devices operating in coordination. Processor(s) 722 may be configured to execute modules 708, 710, 712, 714, and/or 716, and/or other modules. Processor(s) 722 may be configured to execute modules 708, 710, 712, 714, and/or 716, and/or other modules by software; hardware; firmware; some combination of software, hardware, and/or firmware; and/or other mechanisms for configuring processing capabilities on processor(s) 722. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 708, 710, 712, 714, and/or 716 are illustrated in FIG. 7 as being implemented within a single processing unit, in implementations in which processor(s) 722 includes multiple processing units, one or more of modules 708, 710, 712, 714, and/or 716 may be implemented remotely from the other modules. The description of the functionality provided by the different modules 708, 710, 712, 714, and/or 716 described below is for illustrative purposes, and is not intended to be limiting, as any of modules 708, 710, 712, 714, and/or 716 may provide more or less functionality than is described. For example, one or more of modules 708, 710, 712, 714, and/or 716 may be eliminated, and some or all of its functionality may be provided by other ones of modules 708, 710, 712, 714, and/or 716. As another example, processor(s) 722 may be configured to execute one or more additional modules that may perform some or all of the functionality attributed below to one of modules 708, 710, 712, 714, and/or 716.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 8:
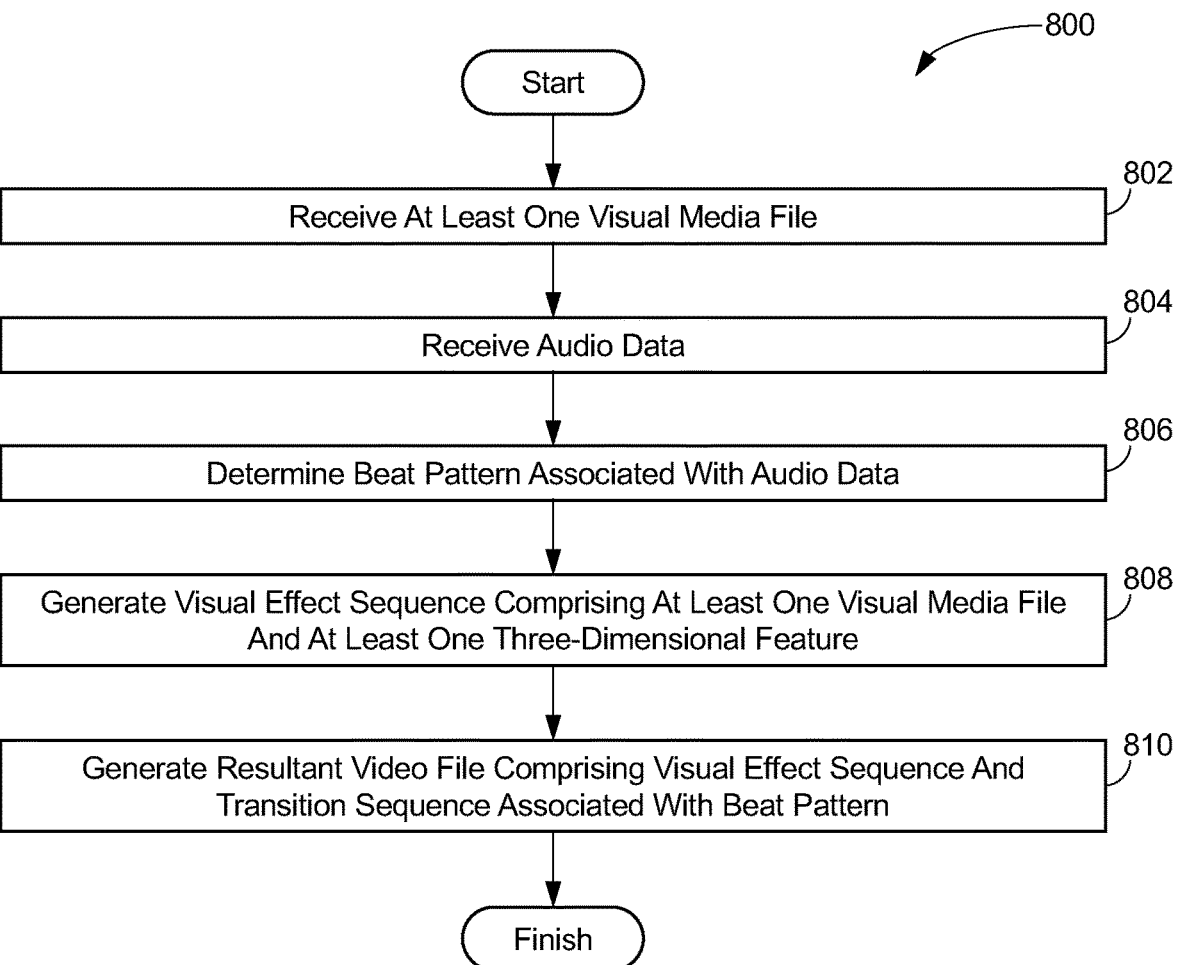
FIG. 8 illustrates an example flow diagram for synchronizing audio and video data, according to certain aspects of the disclosure.

FIG. 8 illustrates an example flow diagram (e.g., process 800) for synchronizing audio and video data, according to certain aspects of the disclosure. For explanatory purposes, the example process 800 is described herein with reference to FIGS. 1-7. Further for explanatory purposes, the steps of the example process 800 are described herein as occurring in serial, or linearly. However, multiple instances of the example process 800 may occur in parallel. For purposes of explanation of the subject technology, the process 800 will be discussed in reference to FIGS. 1-7.

At step 802, the process 800 may include receiving at least one visual media file. The at least one visual media file may include an image file or a video file. At step 804, the process 800 may include receiving audio data. The audio data may include at least one song. At step 806, the process 800 may include determining a beat pattern associated with the audio data. At step 808, the process 800 may include generating a visual effect sequence including the at least one visual media file and at least one three-dimensional feature. At step 810, the process 800 may include generating a resultant video file including the visual effect sequence and a transition sequence associated with the beat pattern.

For example, as described above in relation to FIG. 7, at step 802, the process 800 may include receiving at least one visual media file. The at least one visual media file may include an image file or a video file, through media receiving module 708. At step 804, the process 800 may include receiving audio data, through data receiving module 710. The audio data may include at least one song. At step 806, the process 800 may include determining a beat pattern associated with the audio data, through beat pattern determination module 712. At step 808, the process 800 may include generating a visual effect sequence including the at least one visual media file and at least one three-dimensional feature, through effect sequence generating module 714. At step 810, the process 800 may include generating a resultant video file including the visual effect sequence and a transition sequence associated with the beat pattern, through video file generating module 716.

According to an aspect, the at least one three-dimensional feature is generated from a model configured to extract a depth projection from a two-dimensional image.

According to an aspect, receiving the audio data comprises determining a vibe associated with synchronizing the at least one visual media file and the audio data.

According to an aspect, the vibe is determined from metadata associated with one or both of the audio data and/or the at least one visual media file.

According to an aspect, the visual effect sequence includes one or more successive visual effects.

According to an aspect, a given visual effect includes a process by which imagery is created and/or manipulated outside a context of underlying visual media, and wherein the given visual effect includes applying one or more of a gradient, a mathematical colormap, a change in color value, a translation, a flip, a mirror, a rotation, a scaling up or down, a shear, a distortion, a blur, and/or a filter to a given visual media file.

According to an aspect, the at least one three-dimensional feature includes an object in a foreground of the at least one visual media file.

According to an aspect, the at least one visual media file is re-rendered with a zoom-and-pan effect such that the object appears to move relative to a background of the at least one visual media file as a field of view changes, and the zoom-and-pan effect includes decreasing the field of view while simultaneously moving the field of view within bounds of the at least one visual media file.

According to an aspect, the at least one song comprises a melody definable by a beat pattern.

According to an aspect, the beat pattern includes a series of beats in the at least one song.

According to an aspect, determining the beat pattern includes converting a sound waveform of the at least one song into a spectrogram.

According to an aspect, the spectrogram includes a two-dimensional time-frequency representation of the at least one song.

According to an aspect, determining the beat pattern includes weighting energy values within each critical band of a simulated response of a human brain to musical sounds.

According to an aspect, the simulated response is based on cochlea model.

According to an aspect, the beat pattern can be determined for multiple songs to be integrated into a resultant video file.

According to an aspect, generating the resultant video file includes synchronizing the at least one visual media to the beat pattern by trimming the at least one visual media file such that a beginning and an ending coincide with beats in the beat pattern.

Figure 9:
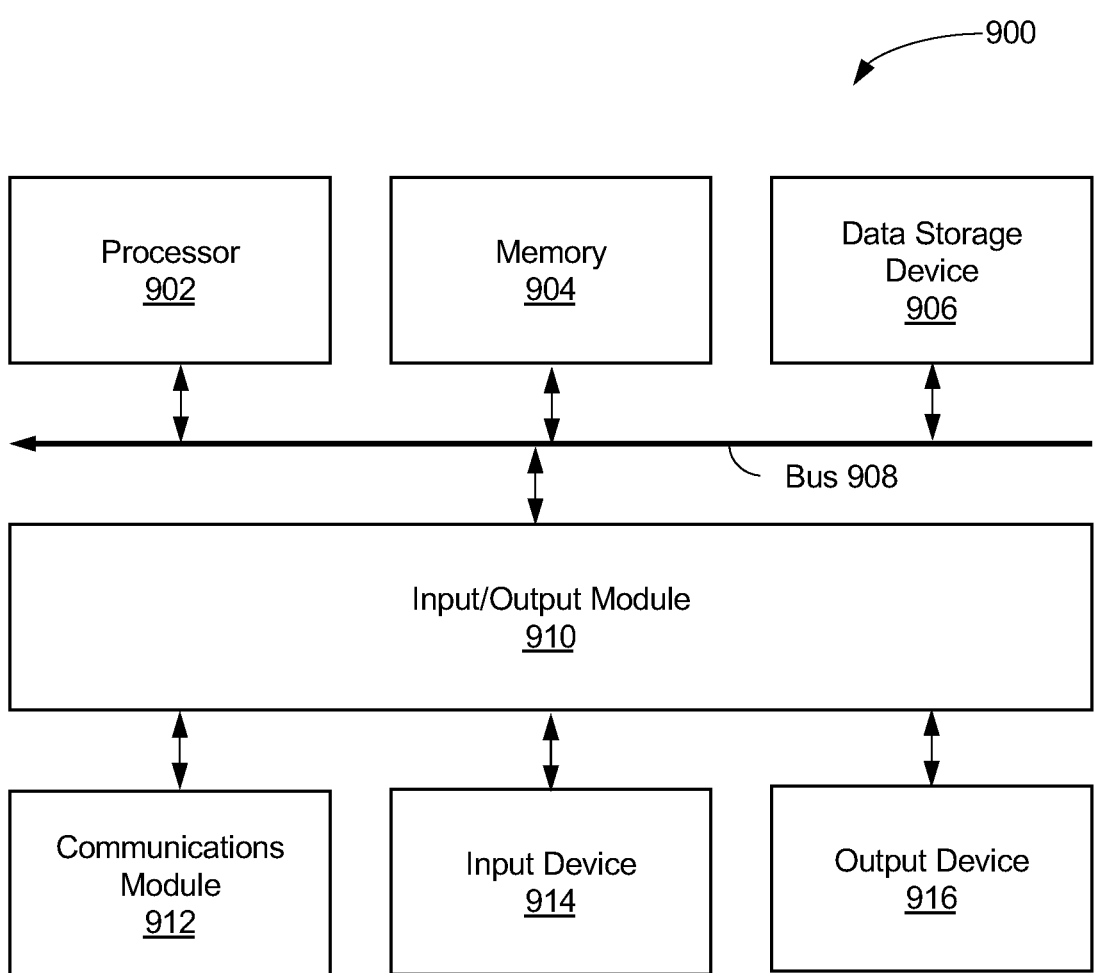
FIG. 9 is a block diagram illustrating an example computer system (e.g., representing both client and server) with which aspects of the subject technology can be implemented.

FIG. 9 is a block diagram illustrating an exemplary computer system 900 with which aspects of the subject technology can be implemented. In certain aspects, the computer system 900 may be implemented using hardware or a combination of software and hardware, either in a dedicated server, integrated into another entity, or distributed across multiple entities.

Computer system 900 (e.g., server and/or client) includes a bus 908 or other communication mechanism for communicating information, and a processor 902 coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java,.NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as an LCD (liquid crystal display) monitor, for displaying information to the user.

According to one aspect of the present disclosure, the above-described gaming systems can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in the main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 900 reads game data and provides a game, information may be read from the game data and stored in a memory device, such as the memory 904. Additionally, data from the memory 904 servers accessed via a network the bus 908, or the data storage 906 may be read and loaded into the memory 904. Although data is described as being found in the memory 904, it will be understood that data does not have to be stored in the memory 904 and may be stored in other memory accessible to the processor 902 or distributed among several media, such as the data storage 906.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have." or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for synchronizing audio and video data, the method comprising:
   receiving at least one visual media file, the at least one visual media file including an image file or a video file;

receiving audio data, the audio data including at least one song;
   determining a beat pattern associated with the audio data, the beat pattern indicating a temporal position of a beat within the audio data;
   generating a first visual effect sequence and a second visual effect sequence comprising the at least one visual media file and at least one three-dimensional feature, wherein the at least one three-dimensional feature includes an object in a foreground of the at least one visual media file; and
   generating a resultant video file comprising the first visual effect sequence that transitions into the second visual effect sequence at the temporal position of the beat in the audio data, wherein the at least one visual media file is re-rendered with a zoom-and-pan effect such that the object appears to move relative to a background of the at least one visual media file as a field of view changes.

2. The method of claim 1, wherein the at least one three-dimensional feature is generated from a model configured to extract a depth projection from a two-dimensional image.

3. The method of claim 1, wherein receiving the audio data comprises determining a vibe associated with synchronizing the at least one visual media file and the audio data.

4. The method of claim 3, wherein the vibe is determined from metadata associated with one or both of the audio data and/or the at least one visual media file.

5. The method of claim 1, wherein the first visual effect sequence includes one or more successive visual effects.

6. The method of claim 5, wherein a given visual effect includes a process by which imagery is created and/or manipulated outside a context of underlying visual media.

7. The method of claim 6, wherein the given visual effect includes applying one or more of a gradient, a mathematical colormap, a change in color value, a translation, a flip, a mirror, a rotation, a scaling up or down, a shear, a distortion, a blur, and/or a filter to a given visual media file.

8. The method of claim 1, wherein the zoom-and-pan effect includes decreasing the field of view while simultaneously moving the field of view within bounds of the at least one visual media file.

9. A system configured for synchronizing audio and video data, the system comprising:
   one or more hardware processors configured by machine-readable instructions to:
      receive at least one visual media file, the at least one visual media file including an image file or a video file;
      receive audio data, the audio data including at least one song, wherein receiving the audio data comprises determining a vibe associated with synchronizing the at least one visual media file and the audio data;
      determine a beat pattern associated with the audio data;
      generate a visual effect sequence comprising the at least one visual media file and at least one three-dimensional feature, wherein the at least one three-dimensional feature is generated from a model configured to extract a depth projection from a two-dimensional image, wherein the at least one three-dimensional feature includes an object in a foreground of the at least one visual media file, and wherein the at least one visual media file is re-rendered with a zoom-and-pan effect such that the object appears to move relative to a background of the at least one visual media file as a field of view changes; and generate a resultant video file comprising the visual effect sequence and a transition sequence associated with the beat pattern.

10. The system of claim 9, wherein the at least one song comprises a melody definable by a beat pattern.

11. The system of claim 10, wherein the beat pattern includes a series of beats in the at least one song.

12. The system of claim 10, wherein determining the beat pattern includes converting a sound waveform of the at least one song into a spectrogram.

13. The system of claim 12, wherein the spectrogram includes a two-dimensional time-frequency representation of the at least one song.

14. The system of claim 10, wherein determining the beat pattern includes weighting energy values within each critical band of a simulated response of a human brain to musical sounds.

15. The system of claim 14, wherein the simulated response is based on cochlea model.

16. The system of claim 10, wherein the beat pattern can be determined for multiple songs to be integrated into a resultant video file.

17. The system of claim 9, wherein generating the resultant video file includes synchronizing the at least one visual media to the beat pattern by trimming the at least one visual media file such that a beginning and an ending coincide with beats in the beat pattern.

18. A non-transient computer-readable storage medium having instructions embodied thereon, the instructions being executable by one or more processors to perform a method for synchronizing audio and video data, the method comprising:

receiving at least one visual media file, the at least one visual media file including an image file or a video file;

receiving audio data, the audio data including at least one song, wherein receiving the audio data comprises determining a vibe associated with synchronizing the at least one visual media file and the audio data;

determining a beat pattern associated with the audio data;

generating a visual effect sequence comprising the at least one visual media file and at least one three-dimensional feature, wherein the at least one three-dimensional feature is generated from a model configured to extract a depth projection from a two-dimensional image, wherein the at least one three-dimensional feature includes an object in a foreground of the at least one visual media file, and wherein the at least one visual media file is re-rendered with a zoom-and-pan effect such that the object appears to move relative to a background of the at least one visual media file as a field of view changes; and generating a resultant video file comprising the visual effect sequence and a transition sequence associated with the beat pattern, wherein generating the resultant video file includes synchronizing the at least one visual media to the beat pattern by trimming the at least one visual media file such that a beginning and an ending coincide with beats in the beat pattern.

* * * * *